United States Patent
Miura et al.

(10) Patent No.: US 8,307,929 B2
(45) Date of Patent: Nov. 13, 2012

(54) DRIVE CONTROL APPARATUS FOR ROTATING ELECTRIC MACHINES AND VEHICLE

(75) Inventors: Tetsuya Miura, Nishikamo-gun (JP); Akira Takasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 570 days.

(21) Appl. No.: 12/448,972

(22) PCT Filed: Feb. 12, 2008

(86) PCT No.: PCT/JP2008/052608
§ 371 (c)(1),
(2), (4) Date: Jul. 17, 2009

(87) PCT Pub. No.: WO2008/102714
PCT Pub. Date: Aug. 28, 2008

(65) Prior Publication Data
US 2010/0140002 A1 Jun. 10, 2010

(30) Foreign Application Priority Data
Feb. 21, 2007 (JP) ................................. 2007-040840

(51) Int. Cl.
*B60W 20/00* (2006.01)
(52) U.S. Cl. ............................... 180/65.285; 180/65.265
(58) Field of Classification Search ................. 180/65.1, 180/65.285
See application file for complete search history.

(56) References Cited

U.S. PATENT DOCUMENTS

| 6,427,794 | B1 | 8/2002 | Raftari et al. |
| 6,854,881 | B2 * | 2/2005 | Nada .............................. 374/169 |
| 2001/0050190 | A1 * | 12/2001 | Takenaka ..................... 180/65.2 |
| 2002/0006154 | A1 | 1/2002 | Nada |
| 2003/0076065 | A1 | 4/2003 | Shafer et al. |
| 2006/0207809 | A1 | 9/2006 | Casey |
| 2009/0033260 | A1 | 2/2009 | Fernengel et al. |

FOREIGN PATENT DOCUMENTS

| DE | 102 43 217 A1 | 5/2003 |
| DE | 10 2005 026 439 A1 | 12/2006 |
| JP | A-02-101944 | 4/1990 |
| JP | U-2-65081 | 5/1990 |
| JP | A-11-243658 | 9/1999 |

(Continued)

OTHER PUBLICATIONS

Sep. 16, 2011 Office Action issued in German Patent Application No. 11 2008 000 467.632 (with translation).

(Continued)

*Primary Examiner* — Katy M Ebner
(74) *Attorney, Agent, or Firm* — Oliff & Berridge, PLC

(57) ABSTRACT

First and second motors have structures different from each other. A control device estimates a first magnet temperature of the first motor and a second magnet temperature of the second motor and controls a drive unit based on the first and second magnet temperatures. The control device estimates the first magnet temperature using a first parameter (the temperature of cooling oil of the first and second motors) and estimates the second magnet temperature using the temperature of the stator of the second motor. Since an appropriate parameter is selected from among a plurality of parameters concerning the state of the first and second motors, the first and second magnet temperatures can be estimated more accurately.

8 Claims, 10 Drawing Sheets

FOREIGN PATENT DOCUMENTS

| | | | |
|---|---|---|---|
| JP | 2000023421 A * | 1/2000 | |
| JP | A-2000-023421 | 1/2000 | |
| JP | A-2000-184502 | 6/2000 | |
| JP | A-2001-157304 | 6/2001 | |
| JP | A-2001-318008 | 11/2001 | |
| JP | A-2002-051595 | 2/2002 | |
| JP | A-2003-134869 | 5/2003 | |
| JP | A-2003-164010 | 6/2003 | |
| JP | A-2005-12914 | 1/2005 | |
| JP | A-2006-14554 | 1/2006 | |

OTHER PUBLICATIONS

Office Action issued in Japanese Application No. 2007-040840 dated Feb. 15, 2011 (with translation).

* cited by examiner

VARIATION DIRECTION OF MAGNETIC FIELD

DRIVE CONTROL APPARATUS FOR ROTATING ELECTRIC MACHINES AND VEHICLE

TECHNICAL FIELD

The present invention relates to a drive control apparatus for rotating electric machines and a vehicle, and more particularly to a technique of preventing demagnetization of a permanent magnet included in a rotor in a permanent magnetic synchronous machine.

BACKGROUND ART

In recent years, electric powered vehicles such as hybrid vehicles and electric vehicles receive great attention as environmentally friendly cars. Such an electric powered vehicle includes a power storage device such as a secondary battery and a motor generator receiving electric power from the power storage device for generating a driving force. The motor generator generates a driving force at a time of starting or acceleration and also converts kinetic energy of the vehicle into electric energy for recovery into the power storage device at a time of braking.

As a motor generator mounted on such a motor vehicle, a permanent magnetic synchronous machine is often used, because of easiness of increasing magnetic flux density and power regeneration. Specifically, an interior permanent magnet synchronous machine is frequently employed in which driving torque (reluctance torque) generated by asymmetry of magnetic reluctance can be used in combination.

Permanent magnets are generally known to have magnetic coercive force changed according to environmental temperatures. For example, when a ferromagnetic material that is a main component of a permanent magnet is exposed in a high environmental temperature exceeding a Curie temperature marking a phase transition, the magnetic coercive force of the permanent magnet decreases, possibly causing irreversible demagnetization.

Japanese Patent Laying-Open No. 2001-157304 discloses a rotating electric machine for a hybrid car in which demagnetization of a magnet due to a temperature increase can be prevented. The hybrid car includes first and second rotating electric machines and a control device. The control device estimates a temperature of a permanent magnet of the first rotating electric machine based on data input for control of an engine and the first and second rotating electric machines. The control device estimates a temperature of an armature coil from the temperature of the permanent magnet to set the maximum carrying current value based on the armature coil temperature. The control device limits the current value in the armature to the maximum value or lower.

A method of estimating a temperature of the permanent magnet as disclosed in Japanese Patent Laying-Open No. 2001-157304 is, for example, as follows. First, a ratio K between the absolute values of a torque command value and output torque of the first rotating electric machine is calculated. Then, the magnet temperature is estimated by substituting the calculated ratio K into a map associating the magnet temperature with the ratio K.

In the foregoing temperature estimating method, the estimation accuracy may vary according to the difference in structure between the rotating electric machines. When the estimation accuracy is low, the estimated temperature may be lower than the actual magnet temperature. If the estimated temperature is lower than the actual temperature, it is likely that the rotating electric machine continues to operate without a temperature increase of the rotating electric machine being suppressed. Accordingly, the possibility that demagnetization of the permanent magnet occurs becomes high.

DISCLOSURE OF THE INVENTION

An object of the present invention is to provide a drive control apparatus for rotating electric machines capable of estimating a temperature of a permanent magnet included in the rotating electric machines more precisely and a vehicle including the drive control apparatus.

In summary, the present invention provides a drive control apparatus for driving and controlling a first rotating electric machine including a first rotor having a first permanent magnet and a second rotating electric machine having a structure different from the first rotating electric machine and including a second rotor having a second permanent magnet. The drive control apparatus includes a drive unit for driving the first and second rotating electric machines, and a control unit for estimating a temperature of the first permanent magnet and a temperature of the second permanent magnet, and for controlling the drive unit based on a result of the estimation. The control unit includes a temperature estimation unit. The temperature estimation unit selects first and second parameters respectively corresponding to the first and second rotating electric machines from among a plurality of parameters concerning states of the first and second rotating electric machines, based on a difference in structure between the first and second rotating electric machines. The temperature estimation unit estimates the temperature of the first permanent magnet and the temperature of the second permanent magnet using the first and second parameters, respectively.

Preferably, the length in a rotation axis direction of the second rotating electric machine is longer than the length in a rotation axis direction of the first rotating electric machine.

More preferably, the first rotating electric machine further includes a first stator provided around the first rotor. The second rotating electric machine further includes a second stator provided around the second rotor. The first and second rotors and the first and second stators are cooled by a cooling medium. The first parameter is a temperature of the cooling medium. The second parameter is a temperature of the second stator.

Further preferably, the cooling medium is cooling oil.

Preferably, the drive unit includes first and second inverters for driving the first and second rotating electric machines, respectively. The control unit further includes an inverter control unit. The inverter control unit limits output current of the first inverter when the temperature of the first permanent magnet is a first threshold temperature or higher. The inverter control unit limits output current of the second inverter when the temperature of the second permanent magnet is a second threshold temperature or higher.

Preferably, the first and second rotating electric machines are mounted on a vehicle including an internal combustion engine and a drive wheel. The first rotating electric machine is coupled to the internal combustion engine. The second rotating electric machine is coupled to the drive wheel.

In accordance with another aspect, the present invention provides a vehicle including: a first rotating electric machine including a first rotor having a first permanent magnet; a second rotating electric machine having a structure different from the first rotating electric machine and including a second rotor having a second permanent magnet; a drive unit for driving the first and second rotating electric machines; and a control unit for estimating a temperature of the first permanent magnet and a temperature of the second permanent magnet, and for controlling the drive unit based on a result of the estimation. The control unit includes a temperature estimation unit. The temperature estimation unit selects first and second parameters respectively corresponding to the first and second rotating electric machines from among a plurality of parameters concerning states of the first and second rotating electric machines based on a difference in structure between the first and second rotating electric machines. The temperature estimation unit estimates the temperature of the first permanent magnet and the temperature of the second permanent magnet using the first and second parameters, respectively.

Preferably, the length in a rotation axis direction of the second rotating electric machine is longer than the length in a rotation axis direction of the first rotating electric machine.

More preferably, the first rotating electric machine further has a first stator provided around the first rotor. The second rotating electric machine further has a second stator provided around the second rotor. The first and second rotors and the first and second stators are cooled by a cooling medium. The first parameter is a temperature of the cooling medium. The second parameter is a temperature of the second stator.

Further preferably, the cooling medium is cooling oil.

Preferably, the drive unit includes first and second inverters for driving the first and second rotating electric machines, respectively. The control unit further includes an inverter control unit. The inverter control unit limits output current of the first inverter when the temperature of the first permanent magnet is a first threshold temperature or higher. The inverter control unit limits output current of the second inverter when the temperature of the second permanent magnet is a second threshold temperature or higher.

Preferably, the vehicle further includes: an internal combustion engine having the first rotating electric machine coupled thereto; and a drive wheel having the second rotating electric machine coupled thereto.

In accordance with the present invention, the temperature of a permanent magnet included in a rotating electric machine can be estimated more precisely.

BEST MODES FOR CARRYING OUT THE INVENTION

Figure 1:
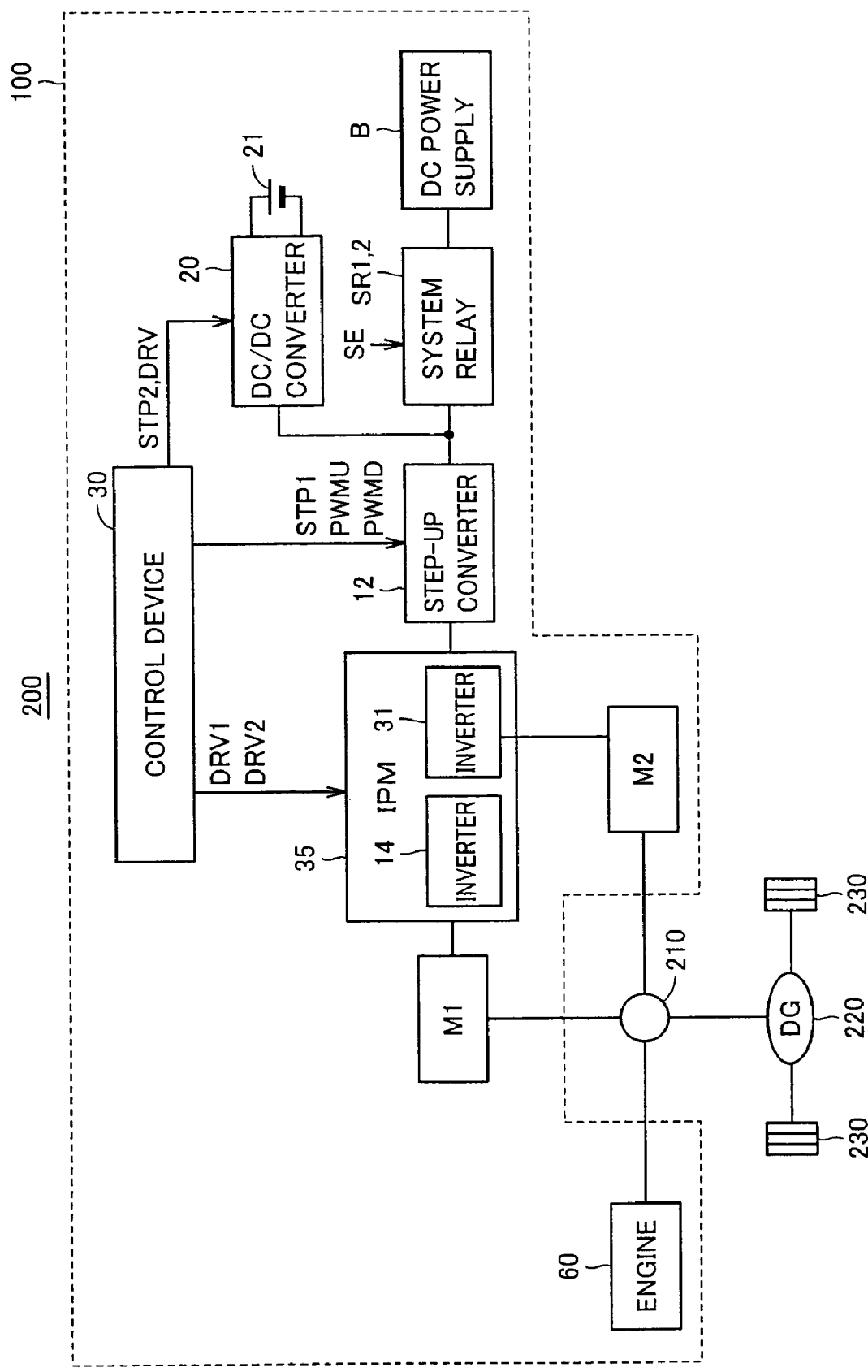
FIG. 1 is a schematic block diagram showing an exemplary hybrid vehicle equipped with a drive control apparatus for rotating electric machines in accordance with an embodiment of the present invention.

In the following, an embodiment of the present invention will be described in detail with reference to the drawings. It is noted that the same or corresponding parts in the figures are denoted with the same reference characters and the description will not be repeated.

[Overall Configuration]

FIG. 1 is a schematic block diagram showing an exemplary hybrid vehicle equipped with a drive control apparatus for rotating electric machines in accordance with an embodiment of the present invention.

Referring to FIG. 1, a hybrid vehicle 200 includes a hybrid vehicle drive apparatus 100, a power split device 210, a differential gear (DG) 220, and front wheels 230. Hybrid vehicle drive apparatus 100 includes a DC power supply B, system relays SR1, SR2, a step-up converter 12, inverters 14, 31, a DC/DC converter 20, an auxiliary battery 21, a control device 30, an engine 60, and AC motors M1, M2. Inverters 14, 31 constitute an IPM (intelligent power module) 35. IPM 35 is a drive unit driving AC motors M1, M2.

AC motor M1 is coupled to engine 60 through power split device 210. Then, AC motor M1 starts engine 60 or generates electric power using a rotational force of engine 60. On the other hand, AC motor M2 drives front wheels 230 through power split device 210 and differential gear 220.

AC motors M1, M2 are permanent magnetic, three-phase AC synchronous rotating electric machines, by way of example. In other words, each of AC motors M1, M2 is formed to rotate a rotor having a permanent magnet by current magnetic field (rotating magnetic field) produced by drive current flowing in a coil provided for a stator.

DC power supply B is formed of a secondary battery such as a nickel metal hydride or lithium ion battery. System relays SR1, SR2 are turned on/off in response to a signal SE from control device 30. More specifically, system relays SR1, SR2 are turned on in response to signal SE of H (logic high) level from control device 30 and turned off in response to signal SE of L (logic low) level from control device 30.

Step-up converter 12 steps up DC voltage supplied from DC power supply B and supplies the voltage to inverters 14, 31. More specifically, step-up converter 12 receives a signal PWMU from control device 30 to step up and then supply DC voltage to inverters 14, 31. Step-up converter 12 also receives a signal PWMD from control device 30 to step down and then supply DC voltage supplied from inverter 14 (or 31) to DC power supply B and DC/DC converter 20. In addition, step-up converter 12 stops the step-up operation and the step-down operation in response to a signal STP1 from control device 30.

Inverter 14 receives DC voltage supplied from step-up converter 12 and then converts the DC voltage into AC voltage for driving AC motor M1, based on a signal DRV1 from control device 30. Inverter 14 also converts the AC voltage generated by AC motor M1 into DC voltage based on signal DRV1 from control device 30 and supplies the converted DC voltage to step-up converter 12.

Inverter 31 receives DC voltage supplied from step-up converter 12 and then converts the DC voltage into AC voltage for driving AC motor M2, based on a signal DRV2 from control device 30. At a time of regenerative braking of the hybrid vehicle equipped with hybrid vehicle drive apparatus 100, inverter 31 converts the AC voltage generated by AC motor M2 into DC voltage based on signal DRV2 from control device 30 and supplies the converted DC voltage to step-up converter 12.

It is noted that regenerative braking referred to herein includes braking involving regeneration in a case where a foot brake operation is performed by a driver who drives the hybrid vehicle, and deceleration (or stopping acceleration) of the vehicle with regeneration caused by lifting off the accelerator pedal during travel although the foot brake is not operated.

DC/DC converter 20 is driven by signal DRV from control device 30 and converts DC voltage from DC power supply B for charging auxiliary battery 21. DC/DC converter 20 is stopped in response to a signal STP2 from control device 30. Auxiliary battery 21 stores electric power supplied from DC/DC converter 20.

Control device 30 generates signal DRV1 for controlling inverter 14 when inverter 14 drives AC motor M1, and outputs the generated signal DRV1 to inverter 14. Control device 30 also generates signal DRV2 for controlling inverter 31 when inverter 31 drives AC motor M2, and outputs the generated signal DRV2 to inverter 31.

Furthermore, when inverter 14 (or 31) drives AC motor M1 (or M2), control device 30 generates signal PWMU for controlling step-up converter 12 and the generated signal PWMU to step-up converter 12.

In addition, at a time of regenerative braking of hybrid vehicle 200 equipped with hybrid vehicle drive apparatus 100, control device 30 generates signal DRV2 for converting the AC voltage generated in AC motor M2 into DC voltage and outputs signal DRV2 to inverter 31.

In addition, at a time of regenerative braking of hybrid vehicle 200, control device 30 generates signal PWMD for stepping down the DC voltage supplied from inverter 31 and outputs the generated signal PWMD to step-up converter 12.

Figure 2:
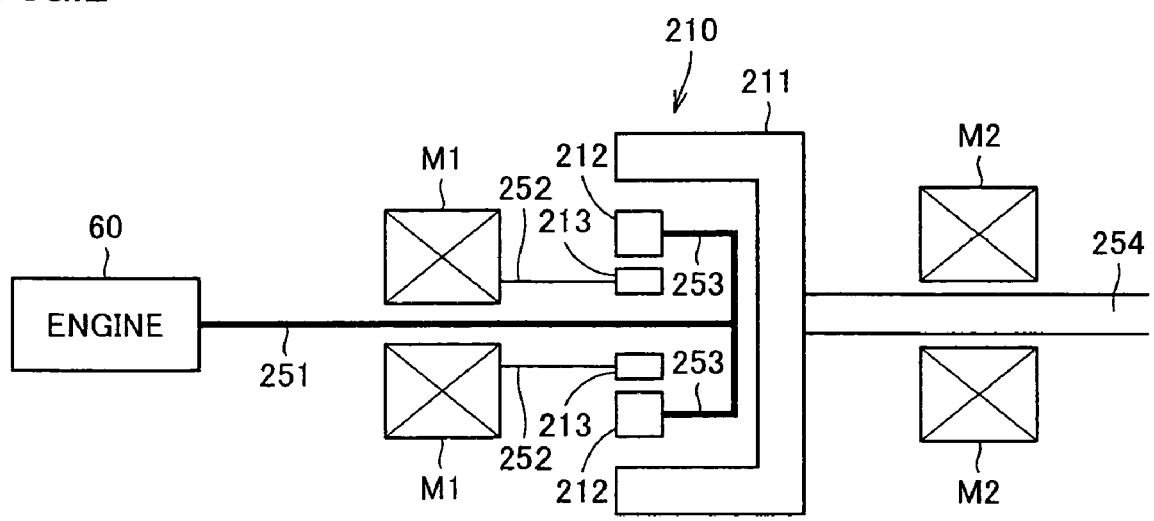
FIG. 2 is a schematic diagram of a power split device 210 shown in FIG. 1.

FIG. 2 is a schematic diagram of power split device 210 shown in FIG. 1. Referring to FIG. 2, power split device 210 includes a ring gear 211, a carrier gear 212, and a sun gear 213. A shaft 251 of engine 60 is connected to a pinion gear 212 through a planetary carrier 253, a shaft 252 of AC motor M1 is connected to sun gear 213, and a shaft 254 of AC motor M2 is connected to ring gear 211. Shaft 254 of AC motor M2 is coupled to a drive shaft of front wheel 230 through DG 220.

AC motor M1 rotates shaft 251 through shaft 252, sun gear 213, pinion gear 212, and planetary carrier 253 to start engine 60. AC motor M1 also receives a rotational force of engine 60 through shaft 251, planetary carrier 253, pinion gear 212, sun gear 213, and shaft 252 and generates electric power using the received rotational force.

Figure 3:
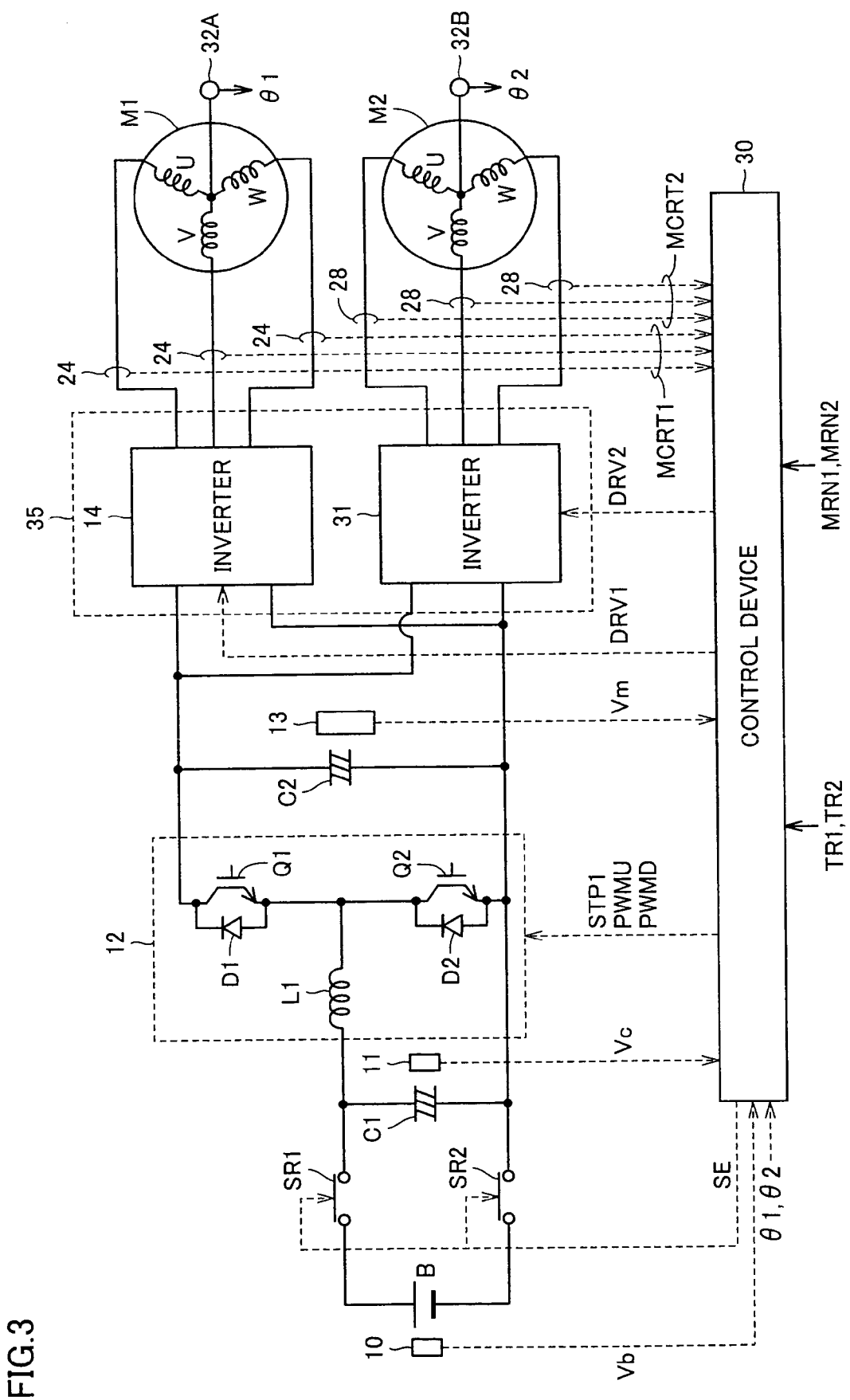
FIG. 3 is a diagram showing in detail a part concerning drive control of AC motors M1, M2 in a hybrid vehicle drive apparatus 100 in FIG. 1.

FIG. 3 is a diagram showing in detail a part concerning drive control of AC motors M1, M2 in hybrid vehicle drive apparatus 100 in FIG. 1.

Referring to FIG. 3, DC power supply B outputs DC voltage. A voltage sensor 10 detects a voltage Vb output from DC power supply B and outputs the detected voltage Vb to control device 30.

System relays SR1, SR2 are turned on in response to signal SE from control device 30 and then supplies DC voltage from DC power supply B to a capacitor C1. Capacitor C1 smoothes the DC voltage supplied from DC power supply B through system relays SR1, SR2 and supplies the smoothed DC voltage to step-up converter 12. Voltage sensor 11 detects a voltage Vc across the ends of capacitor C1 and outputs the detected voltage Vc to control device 30.

Step-up converter 12 includes a reactor L1, IGBT (Insulated Gate Bipolar Transistor) elements Q1, Q2, and diodes D1, D2. Reactor L1 has one end connected to a power supply line of DC power supply B and the other end connected to a midpoint between IGBT element Q1 and IGBT element Q2, that is, between the emitter of IGBT element Q1 and the collector of IGBT element Q2. IGBT elements Q1, Q2 are connected in series between the power supply line and a ground line. IGBT elements Q1, Q2 form an upper arm and a lower arm, respectively.

The collector of IGBT element Q1 is connected to the power supply line, and the emitter of IGBT element Q2 is connected to the ground line. Diodes D1, D2 each supplying current from the emitter side to the collector side are arranged between the respective collectors and emitters of IGBT elements Q1, Q2, respectively.

Step-up converter 12 has IGBT elements Q1, Q2 turned on/off by control device 30 and steps up the DC voltage supplied from capacitor C1 to supply the output voltage to a capacitor C2. Furthermore, step-up converter 12 steps down the DC voltage generated by AC motor M1 or M2 and converted by inverter 14 or 31 at a time of regenerative braking of the hybrid vehicle and supplies the voltage to capacitor C1.

Capacitor C2 smoothes the DC voltage supplied from step-up converter 12 and supplies the smoothed DC voltage to inverters 14, 31. A voltage sensor 13 detects a voltage across the opposite sides of capacitor C2, that is, an output voltage Vm of step-up converter 12.

Inverter 14 receives DC voltage supplied from capacitor C2 and then converts the DC voltage into AC voltage for driving AC motor M1, based on signal DRV1 from control device 30. Accordingly, AC motor M1 is driven to generate torque specified by a torque command value TR1. At a time of power generation of AC motor M1, inverter 14 converts the AC voltage generated by AC motor M1 into DC voltage based on signal DRV1 from control device 30 and supplies the converted DC voltage to step-up converter 12 through capacitor C2.

Inverter 31 receives DC voltage supplied from capacitor C2 and then converts the DC voltage into AC voltage for driving AC motor M2, based on signal DRV2 from control device 30. Accordingly, AC motor M2 is driven to generate torque specified by a torque command value TR2. At a time of regenerative braking of the hybrid vehicle equipped with hybrid vehicle drive apparatus 100, inverter 31 converts the AC voltage generated by AC motor M2 into DC voltage based on signal DRV2 from control device 30 and supplies the converted DC voltage to step-up converter 12 through capacitor C2.

A rotation angle detection unit 32A is arranged for AC motor M1. Rotation angle detection unit 32A is coupled to the rotation shaft of AC motor M1. Rotation angle detection unit 32A detects a rotation angle $\theta 1$ based on a rotational position of the rotor of AC motor M1 and outputs the detected rotation angle $\theta 1$ to control device 30.

A rotation angle detection unit 32B is arranged for AC motor M2. Rotation angle detection unit 32B is coupled to the rotation shaft of AC motor M2. Rotation angle detection unit 32B detects a rotation angle $\theta 2$ based on a rotational position of the rotor of AC motor M2 and outputs the detected rotation angle $\theta 2$ to control device 30.

Control device 30 receives torque command values TR1, TR2 and motor revolution numbers MRN1, MRN2 from an ECU (Electrical Control Unit) provided on the outside. Control device 30 further receives voltage Vb from voltage sensor 10, receives voltage Vc from voltage sensor 11, receives voltage Vm from voltage sensor 13, receives motor current MCRT1 from a current sensor 24, and receives motor current MCRT2 from a current sensor 28. Control device 30 further receives rotation angles θ1, θ2 from rotation angle detection units 32A, 32B.

Control device 30 generates signal DRV1 for controlling switching of the switching elements included in inverter 14, based on voltage Vm, motor current MCRT1, torque command value TR1, and rotation angle θ1, when inverter 14 drives AC motor M1. Control device 30 outputs the generated signal DRV1 to inverter 14.

Control device 30 generates signal DRV2 for controlling switching of the switching elements included in inverter 31, based on voltage Vm, motor current MCRT2, torque command value TR2, and rotation angle θ2, when inverter 31 drives AC motor M2. Control device 30 outputs the generated signal DRV2 to inverter 31.

Control device 30 generates signal PWMU for controlling switching of IGBT elements Q1, Q2 of step-up converter 12, based on voltages Vb, Vm, torque command value TR1 (or TR2), and motor revolution number MRN1 (or MRN2) when inverter 14 (or 31) drives AC motor M1 (or M2). Control device 30 outputs the generated signal PWMU to step-up converter 12.

At a time of regenerative braking of hybrid vehicle 200, control device 30 generates signal DRV2 for converting the AC voltage generated in AC motor M2 into DC voltage. Control device 30 outputs signal DRV2 to inverter 31. In this case, the switching of the switching elements of inverter 31 is controlled by signal DRV2. Accordingly, inverter 31 converts AC voltage generated in AC motor M2 into DC voltage, which is supplied to step-up converter 12.

Control device 30 also generates signal PWMD for stepping down DC voltage supplied from inverter 14 (or 31) and outputs the generated signal PWMD to step-up converter 12. Accordingly, the AC voltage generated by AC motor M1 or M2 is converted into DC voltage and then stepped down to be supplied to DC power supply B.

Figure 4:
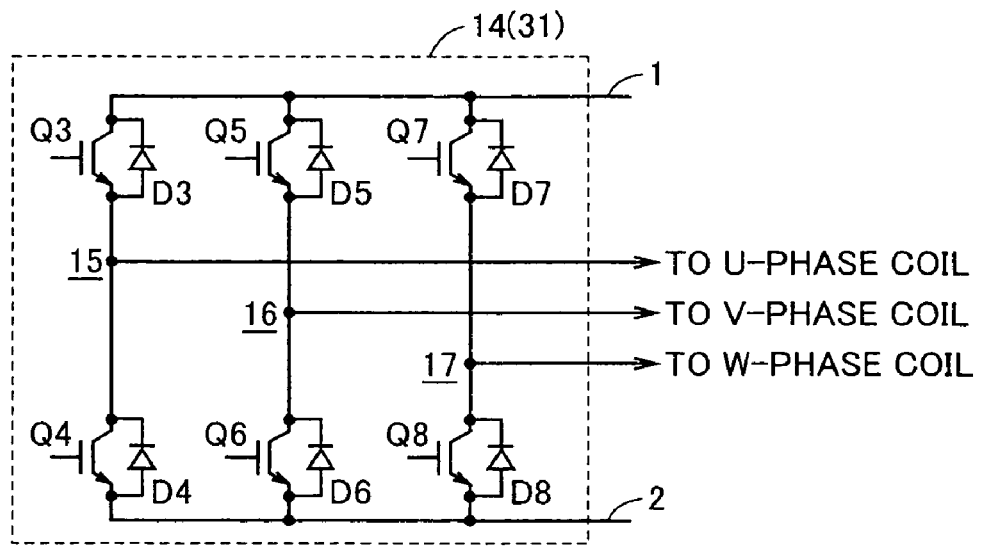
FIG. 4 is a diagram illustrating a configuration of inverters 14, 31.

FIG. 4 is a diagram illustrating a configuration of inverters 14, 31. The configuration of inverter 31 is similar to the configuration of inverter 14. Although the configuration of inverter 14 is representatively described below, the configuration of inverter 31 is equivalent to the one formed by replacing "inverter 14" with "inverter 31" in the configuration of inverter 14 described below.

Referring to FIG. 4, inverter 14 includes a U-phase arm 15, a V-phase arm 16, and a W-phase arm 17. U-phase arm 15, V-phase arm 16, and W-phase arm 17 are provided in parallel between a power supply line 1 and a ground line 2.

U-phase arm 15 is comprised of IGBT elements Q3, Q4 connected in series, V-phase arm 16 is comprised of IGBT elements Q5, Q6 connected in series, and W-phase arm 17 is comprised of IGBT elements Q7, Q8 connected in series. Furthermore, diodes D3-D8 each feeding current from the emitter side to the collector side are connected between the respective collectors and emitters of IGBT elements Q3-Q8, respectively.

The midpoint of each phase arm of inverter 14 is connected to each phase end of each phase coil of AC motor M1. In other words, the other end of the U-phase coil of AC motor M1 is connected to the midpoint between IGBT elements Q3 and Q4, the other end of the V-phase coil is connected to the midpoint between IGBT elements Q5 and Q6, and the other end of the W-phase coil is connected to the midpoint between IGBT elements Q7 and Q8. Similarly, the midpoint of each phase arm of inverter 31 is connected to each phase end of each phase coil of AC motor M2.

Figure 5:
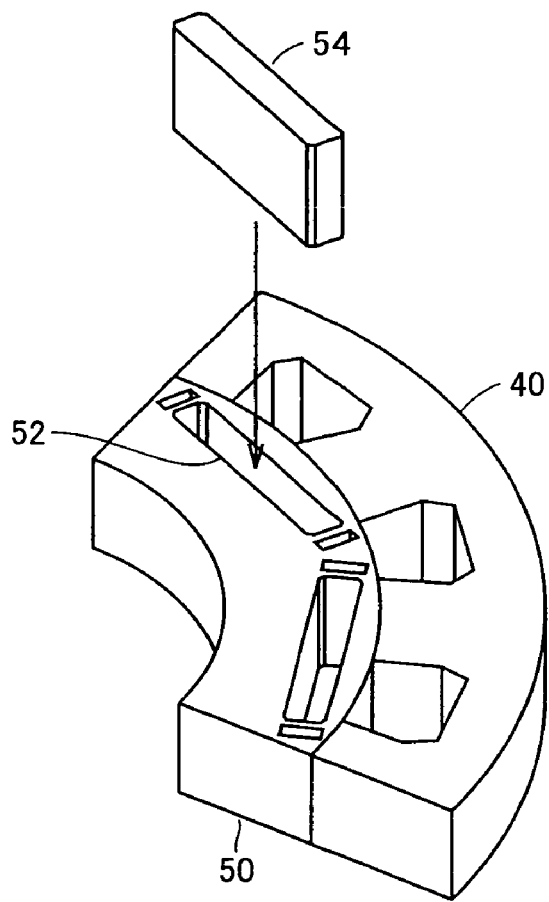
FIG. 5 shows an exemplary configuration of a main part of a permanent magnet rotating electric machine for use in AC motors M1, M2.

FIG. 5 shows an exemplary configuration of a main part of a permanent magnet rotating electric machine for use in AC motors M1, M2. Referring to FIG. 5, in the rotor of the permanent magnet synchronous machine, a pole is formed by forming a plurality of holes 52 in a rotor core 50 and inserting and arranging a permanent magnet 54 in each of holes 52. Then, in a stator 40, a plurality of coils (not shown) are arranged to surround rotor core 50. The rotor is rotatably driven based on a rotating magnetic field formed by supplying power to a plurality of coils.

Here, magnetic flux produced by the coils of stator 40 passes through permanent magnet 54, so that eddy current is generated in permanent magnet 54. The eddy current generated in the magnet causes such problems as heat generation and loss, which become conspicuous with size reduction, enhanced speed, and higher output of the rotating electric machine. Specifically, heat generation leads to demagnetization of the magnet and causes a failure of the rotating electric machine. Furthermore, the loss due to the eddy current reduces the efficiency of the rotating electric machine. Therefore, when the magnet temperature of the permanent magnet is equal to or lower than a prescribed threshold temperature, control device 30 controls inverters 14, 31 in a first mode, and when the magnet temperature exceeds the threshold temperature, control device 30 controls inverters 14, 31 in a second mode in which a temperature increase of the permanent magnet can be suppressed more than in the first mode.

Figure 6:
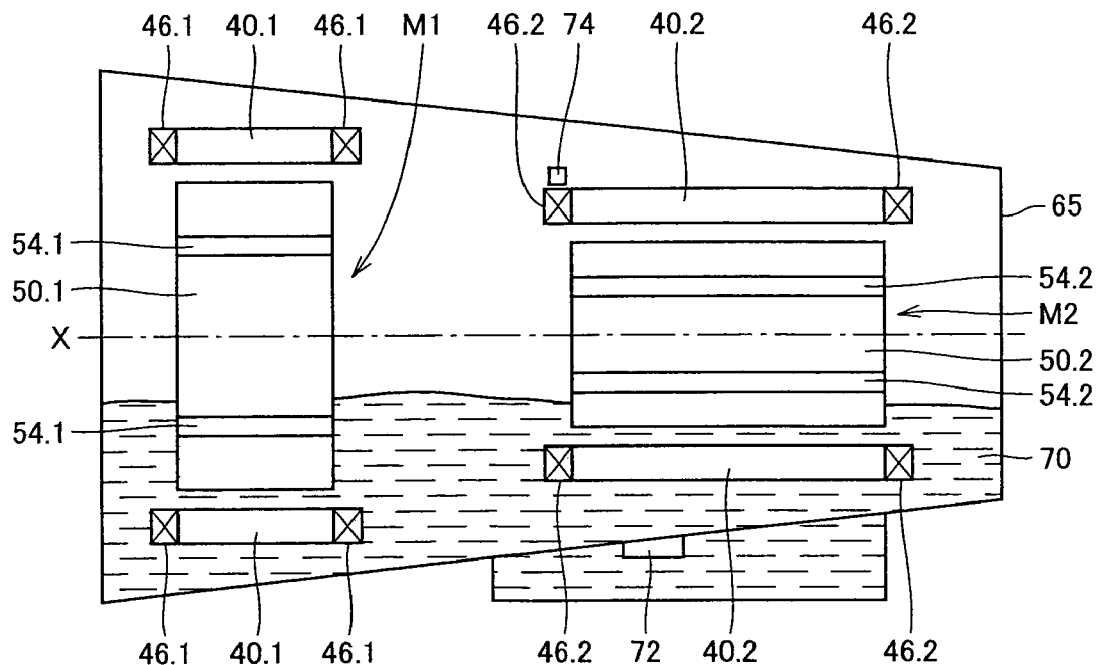
FIG. 6 is a diagram schematically showing a cross section of AC motors M1, M2.

FIG. 6 is a diagram schematically showing a cross section of AC motors M1, M2. In FIG. 6, the cross-sectional direction of AC motors M1, M2 is parallel to the rotation shafts of AC motors M1, M2.

Referring to FIG. 6, AC motors M1, M2 are accommodated in a case 65. AC motor M1 includes a rotor core 50.1 and a permanent magnet 54.1. Permanent magnet 54.1 is inserted into rotor core 50.1. AC motor M1 further includes a stator core 40.1 and a stator coil 46.1 wound around stator core 40.1. Stator core 40.1 (and stator coil 46.1) are provided around rotor core 50.1.

AC motor M2 includes a rotor core 50.2 and a permanent magnet 54.2. Permanent magnet 54.2 is inserted into rotor core 50.2. AC motor M2 further includes a stator core 40.2 and a stator coil 46.2 wound around stator core 40.2. Stator core 40.2 (and stator coil 46.2) are provided around rotor core 50.2.

It is noted that the number of permanent magnets 54.1 and the number of permanent magnets 54.2 are not limited.

An axis X serves as both a rotation axis of AC motor M1 and a rotation axis of AC motor M2. As shown in FIG. 6, the length of rotor core 50.1 in the axis X direction is longer than the length of rotor core 50.2 in the axis X direction. In this manner, AC motor M1 and AC motor M2 are different in structure.

Oil 70 stored in the bottom of case 65 is scooped up by each of rotor cores 50.1 and 50.2. Rotor core 50.1 and the stator (stator core 40.1 and stator coil 46.1) are cooled by oil 70. Similarly, rotor core 50.2 and the stator (stator core 40.2 and stator coil 46.2) are cooled by oil 70.

Specifically, oil 70 is ATF (Automatic Transmission Fluid) of an automatic transmission. In accordance with the present embodiment, the rotors and the stators can be cooled by cooling oil as liquid. Furthermore, in the present embodiment, the rotors and the stators can be cooled by ATF.

Although in the present embodiment the cooling medium is oil, the cooling medium may be, for example, a gas.

A temperature sensor 72 for sensing the temperature of coil 70 is provided at the bottom of case 65. In addition, a temperature sensor 74 for sensing the temperature of the stator of AC motor M2 is provided in the vicinity of stator coil 46.2.

Figure 7:
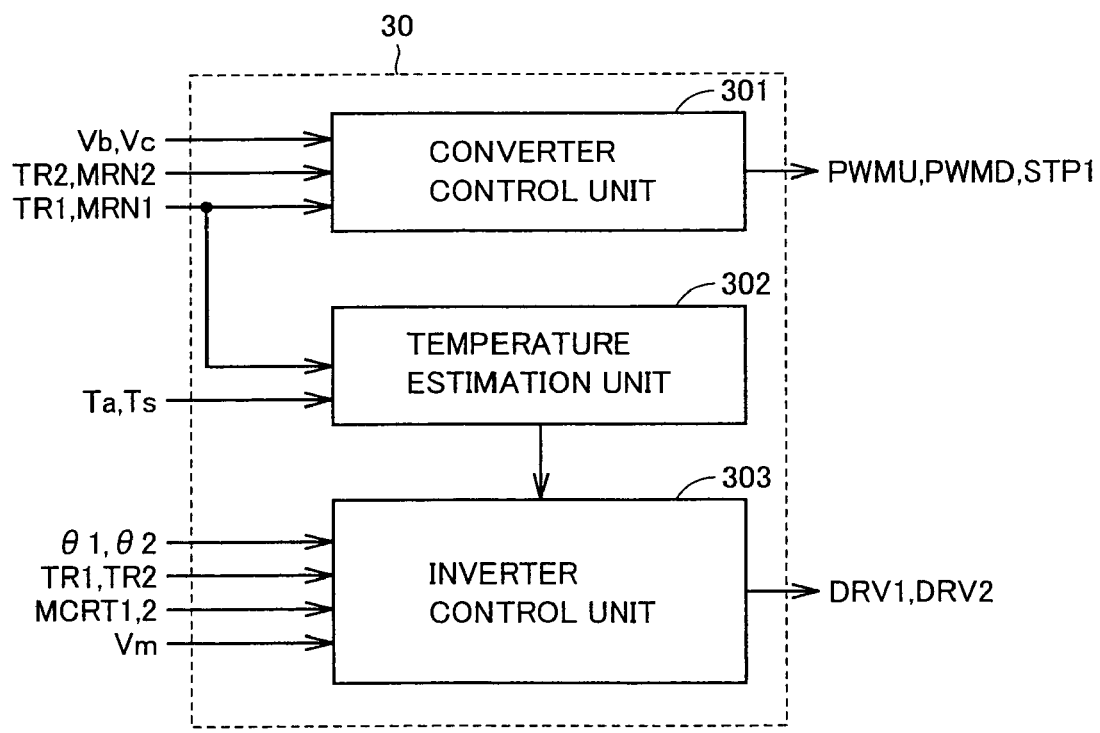
FIG. 7 is a functional block diagram of a control device 30 in FIG. 1.

FIG. 7 is a functional block diagram of control device 30 in FIG. 1. It is noted that control device 30 shown in FIG. 7 may be realized by hardware or may be realized by software.

Referring to FIG. 7, control device 30 includes a converter control unit 301, a temperature estimation unit 302, and an inverter control unit 303. Converter control unit 301 generates and outputs signals PWMU, PWMD, STP1 based on voltage Vb of DC power supply B, voltage Vc of capacitor C1, motor revolution numbers MRN1, MRN2, and torque command values TR1, TR2.

Temperature estimation unit 302 receives motor revolution numbers MRN1, MRN2 and torque command values TR1, TR2. Temperature estimation unit 302 further receives temperature Ta of oil 70 from temperature sensor 72 (see FIG. 6) and receives temperature Ts of stator coil 46.2 from temperature sensor 74 (see FIG. 6). Temperature estimation unit 302 estimates the temperature of permanent magnet 54.1 inserted in rotor core 50.1 of AC motor M1 based on motor revolution number MRN1, torque command value TR1, and temperature Ta. Temperature estimation unit 302 estimates a temperature of permanent magnet 54.2 inserted in rotor core 50.2 of AC motor M2 based on temperature Ts. The details of the temperature estimating method will be described later.

Inverter control unit 303 generates and outputs signals DRV1, DRV2 based on rotation angles θ1, θ2, torque command values TR1, TR2, motor current MCRT1, MCRT2, and output voltage Vm of step-up converter 12. Inverter control unit 303 receives the estimated value of the magnet temperature from temperature estimation unit 302. Inverter control unit 303 limits a load factor of AC motor M1 (M2) when the magnet temperature exceeds a prescribed threshold temperature.

[Magnet Temperature Estimating Method]

Figure 8:
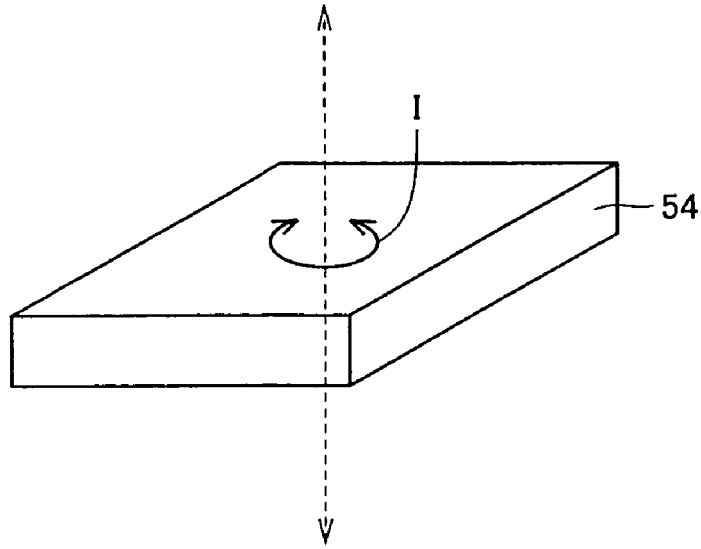
FIG. 8 is a diagram illustrating eddy current produced in a permanent magnet.

FIG. 8 is a diagram illustrating eddy current generated in a permanent magnet. Referring to FIG. 8, when a magnetic field passing through permanent magnet 54 varies in the directions shown by the broken arrow, eddy current I is generated in permanent magnet 54. Eddy current I flows only in the vicinity of the surface of permanent magnet 54. Since Joule heat is generated by eddy current I, the temperature of permanent magnet 54 increases. As the magnetic field varies greater, eddy current I increases. As a result, the temperature of permanent magnet 54 becomes higher. It is noted that when the magnetic field passing through permanent magnet 54 is constant in terms of time, Joule heat is not generated by eddy current.

Since the rotor of the AC motor is rotatably configured, sensor wiring between the rotating rotor and the stationary stator side has to be formed of a rotation joint or the like in order to directly detect the temperature of the permanent magnet provided for the rotor using a temperature sensor or the like. This complicates the structure of the motor.

Control device 30 selects first and second parameters respectively corresponding to AC motors M1, M2 from among a plurality of parameters concerning the state of AC motors M1, M2, based on the difference in structure between AC motors M1 and M2. As described later, in the present embodiment, the first parameter is temperature Ta of oil 70, and the second parameter is temperature Ts of stator coil 46.2. Control device 30 estimates the temperature of permanent magnet 54.1 included in AC motor M1 based on temperature Ts and estimates the temperature of permanent magnet 54.2 included in AC motor M2 based on temperature Ts. An appropriate parameter is selected from among a plurality of parameters depending on the structure of the AC motor, so that the temperature of the permanent magnet can be estimated more accurately.

Figure 9:
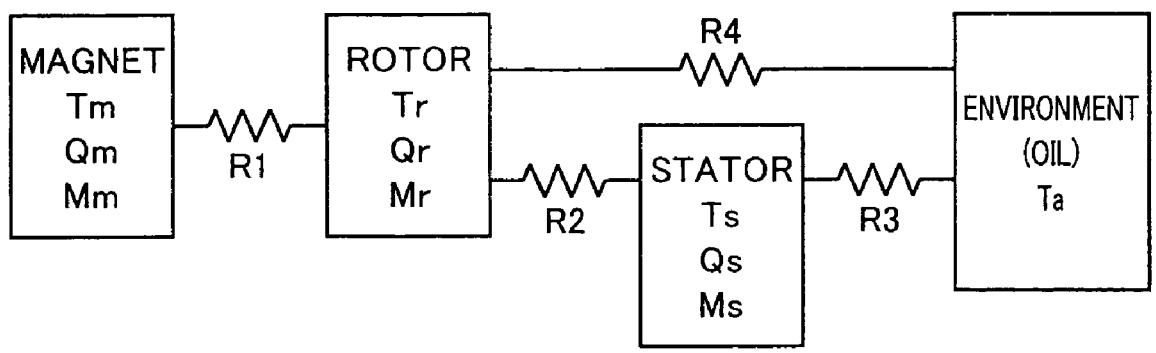
FIG. 9 is a thermal model diagram illustrating a temperature estimating method in the present embodiment.

FIG. 9 is a thermal model diagram for illustrating the temperature estimating method in the present embodiment.

As shown in FIG. 9, the temperature, the amount of heat generation, and the heat capacity of the magnet are represented by Tm, Qm, Mm, respectively. Similarly, the temperature, the amount of heat generation, and the heat capacity of the rotor are represented by Tr, Qr, Mr, respectively. The temperature, the amount of heat generation, and the heat capacity of the stator are represented by Ts, Qs, Ms, respectively. The temperature of environment (oil) is represented by Ta. The thermal resistance between the magnet and the rotor, the thermal resistance between the rotor and the stator, the thermal resistance between the stator and the atmosphere, and the thermal resistance between the rotor and the atmosphere are represented by R1, R2, R3, R4, respectively. These parameters used in the thermal model shown in FIG. 9 correspond to a plurality of parameters concerning the state of AC motors M1, M2.

In this thermal model, the unit of temperature is [° C.]. Furthermore, in this thermal model, "amount of heat generation" is the amount of heat generation per second and its unit is [W] (=[J/second]). The unit of heat capacity is [J/° C.] and the unit of heat resistance is [° C./W].

When this heat model is in a steady state, the relations as in the following equations (1)-(3) hold.

$$Qm=(Tm-Tr)/R1 \quad (1)$$

$$Qm+Qr=(Tr-Ts)/R2+(Tr-Ta)/R4 \quad (2)$$

$$Qs=(Ts-Ta)/R3-(Tr-Ts)/R2 \quad (3)$$

The following equation (4) is derived from the equations (1), (2), (3) above.

$$Tm=(R1+R4)Qm+R4(Qr+Qs)-(R4/R3)Ts+(1+R4/R3)Ta \quad (4)$$

The equation (4) shows that temperature Tm is a linear function defined by the amount of heat generation and the temperature. Next, the validity of the equation (4), that is, the validity of the thermal model in FIG. 9 will be described.

Figure 10:
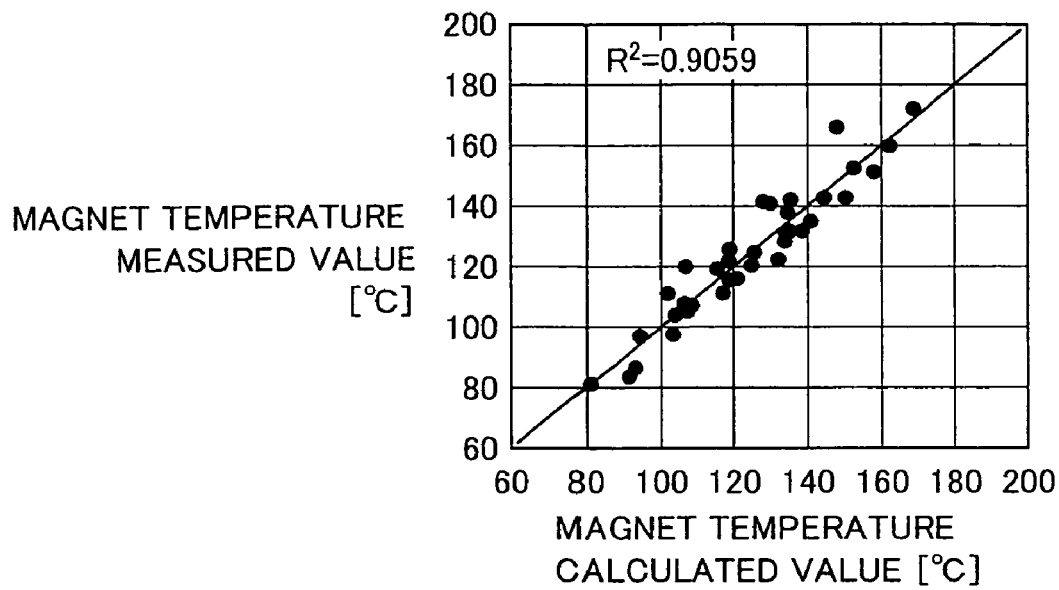
FIG. 10 is a graph showing a result of applying the thermal model in FIG. 9 to AC motor M1.

FIG. 10 is a graph showing the result of applying the thermal model in FIG. 9 to AC motor M1.

Referring to FIG. 10, the graph shows the result of multiple regression analysis performed with N=36, where temperature Tm of the magnet is set as a response variable, and the amount of heat generation of the magnet Qm, the amount of heat generation of the rotor core Qr, the amount of heat generation of the stator Qs, temperature Ts of the stator, and oil temperature Ta are set as explanatory variables. The temperature is a measured value and the amount of heat generation is a calculated value. As a result, a high correlation is found between heat generation of the magnet Qm and oil temperature Ta in AC motor M1.

In the graph in FIG. 10, the axis of abscissas shows the estimated values of the magnet temperature obtained by the regression equation, and the axis of ordinates shows the measured values of the magnet temperature. As a result of the multiple regression analysis above, the contribution ratio ($R^2$) is 0.9059.

The contribution ratio is a value showing the degree of agreement between the measured value and the estimated value, in the range from 0 to 1. As the contribution ratio is closer to 1, the difference between the estimated value and the measured value is decreased. As shown in FIG. 10, a plurality of points each showing the relation between the estimated value and the measured value are distributed in the proximity of the straight line showing that the estimated values are equal to the measured values.

Figure 11:
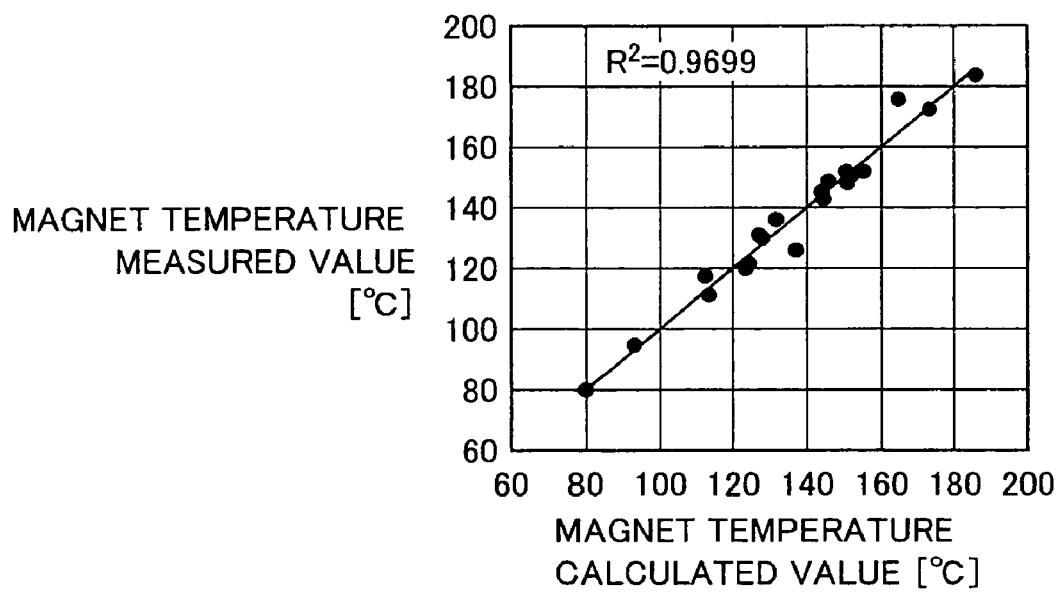
FIG. 11 is a graph showing a result of applying the thermal model in FIG. 9 to AC motor M2.

FIG. 11 is a graph showing the result of applying the thermal model in FIG. 9 to AC motor M2.

Referring to FIG. 11, the graph shows the result of multiple regression analysis performed with N=36, where temperature Tm of the magnet is set as a response variable, and the amount of heat generation of the magnet Qm, the amount of heat generation of the rotor core Qr, the amount of heat generation of the stator Qs, temperature Ts of the stator, and oil temperature Ta are set as explanatory variables. Similarly to the case of AC motor M1, the temperature is a measured value and the amount of heat generation is a calculated value. As a result, a high correlation is found between heat generation of the magnet Qm and temperature Ts of the stator in AC motor M2.

In the graph in FIG. 11, the axis of abscissas shows the estimated values of the magnet temperature obtained by the regression equation, and the axis of ordinates shows the measured values of the magnet temperature. As a result of the multiple regression analysis above, the contribution ratio ($R^2$) is 0.9699. Similarly to FIG. 10, in the graph in FIG. 11, a plurality of points each showing the relation between the estimated value and the measured value are also distributed in the proximity of the straight line showing that the estimated values are equal to the measured values.

A high correlation between the magnet temperature and the oil temperature in AC motor M1 is derived from FIG. 10. A high correlation between the magnet temperature and the stator temperature in AC motor M2 is derived from FIG. 11. The reason of such results is considered as follows.

In FIG. 6, the temperature of oil 70 is the ambient temperature of AC motors M1, M2. Therefore, when the AC motor continues to be used while the operating point of the AC motor remains unchanged, it is assumed that the ambient temperature and the temperature of the permanent magnet become almost equal. Therefore, it is assumed that there is a correlation between the temperature of AC motor M1 and the oil temperature.

However, AC motor M2 has the shaft length longer than that of AC motor M1. Therefore, the stator (stator core 40.2 and stator coil 46.2) of AC motor M2 receives more heat generated from the rotor (the heat-receiving area is larger). On the other hand, the temperature of oil 70 reflects the average temperature of AC motors M1, M2. Accordingly, it is assumed that the temperature of stator coil 46.2 is closer to the temperature of permanent magnet 54.2 than the temperature of oil 70.

In the present embodiment, temperature estimation unit 302 in FIG. 7 stores a map in which the operating states of AC motor M1 are associated with the magnet temperatures and refers to this map to estimate the temperature of the permanent magnet included in the rotor of AC motor M1.

Figure 12:
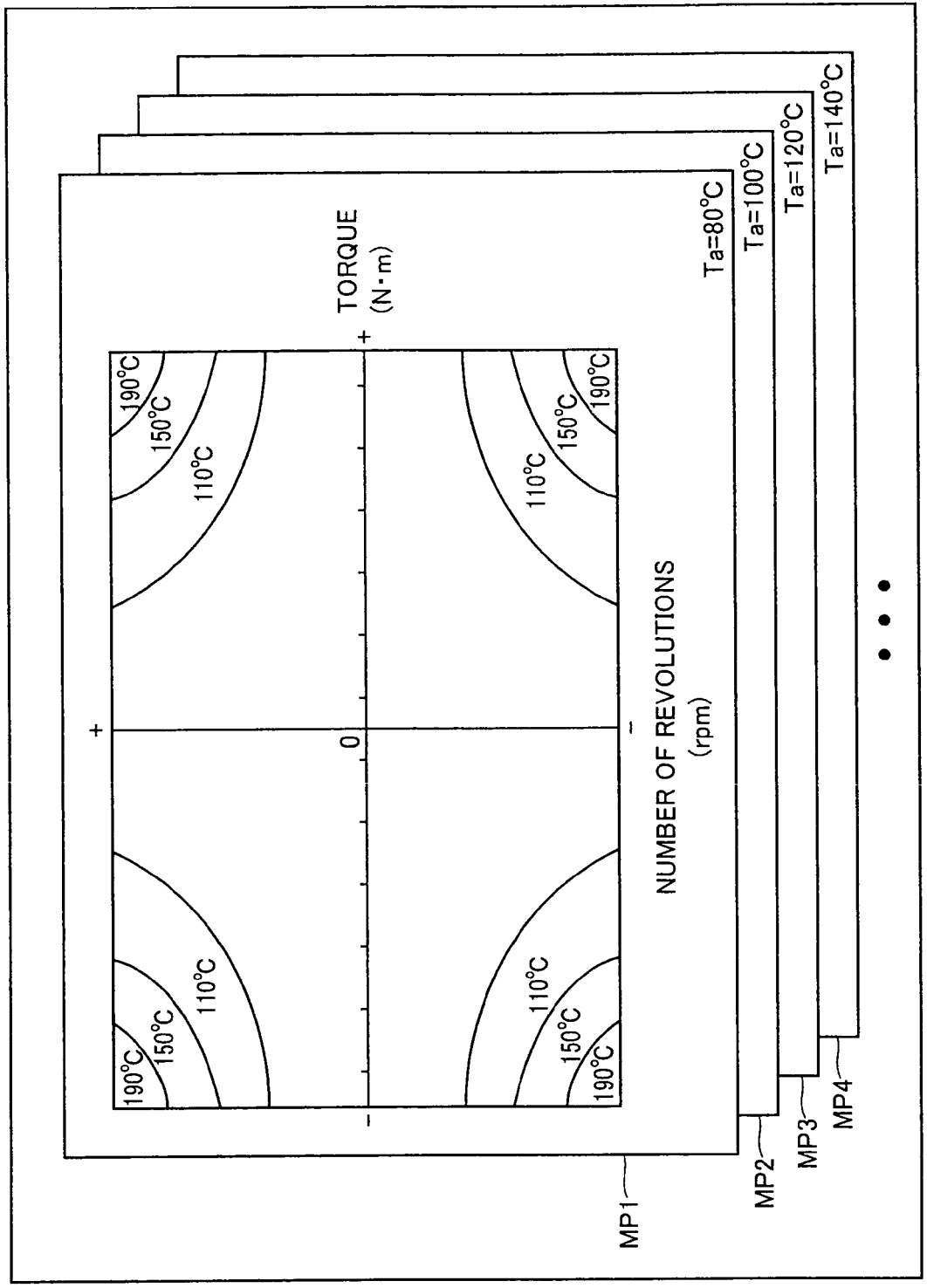
FIG. 12 is a diagram showing a map stored by a temperature estimation unit 302 in FIG. 7.

FIG. 12 is a diagram showing the map stored in temperature estimation unit 302 in FIG. 7.

Referring to FIG. 12, each of maps MP1-MP4 defines the correspondence between the magnet temperatures and the operating points of AC motor M1 determined by torque and the number of revolutions of AC motor M1. Here, the conditions of oil temperature (temperature Ta) differ among maps MP1-MP4.

Temperature estimation unit 302 stores a plurality of maps (maps MP1, MP2, MP3, MP4, etc) which differ between oil temperatures (temperature Ta). Although the number of maps is not limited, the temperature of the permanent magnet included in the rotor of AC motor M1 can be estimated more precisely with more maps.

Temperature estimation unit 302 receives temperature Ta from temperature sensor 72 and selects a map corresponding to temperature Ta from among a plurality of maps. Temperature estimation unit 302 then refers to the map to calculate a magnet temperature from an operating point in the map as determined by torque command value TR1 and motor revolution number MRN1. FIG. 12 shows 110° C., 150° C., and 190° C., as examples of magnet temperatures defined in the map.

Meanwhile, a method of estimating the magnet temperature of AC motor M2 using temperature estimation unit 302 is as follows. Temperature estimation unit 302 stores a correlation equation between a stator temperature and a magnet temperature, which is obtained beforehand. Then, temperature estimation unit 302 estimates the magnet temperature of AC motor M2 based on temperature Ts of the stator obtained by temperature sensor 74 and the correlation equation.

[Control Method for AC Motor]

Figure 13:
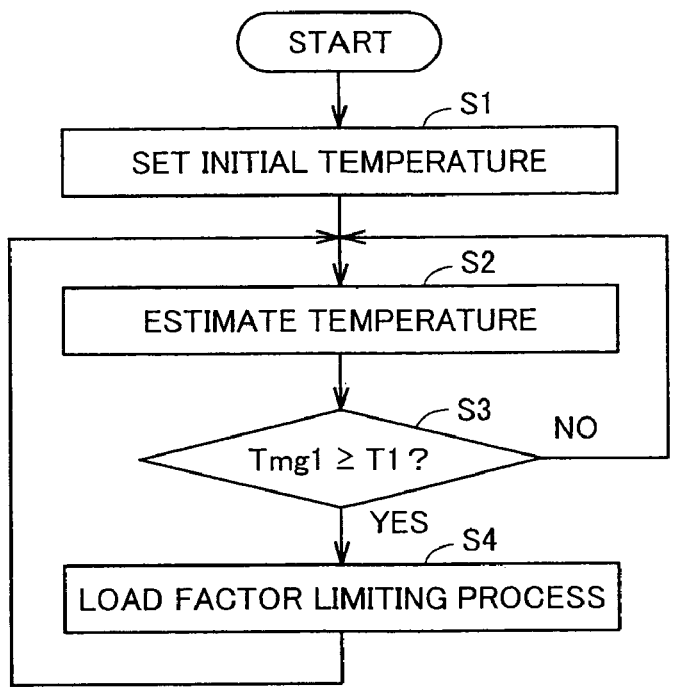
FIG. 13 is a flowchart showing a control process of AC motor M1 in the present embodiment.

FIG. 13 is a flowchart showing a control process for AC motor M1 in the present embodiment.

Referring to FIG. 13 and FIG. 1, upon the start of the process, control device 30 sets an initial, temperature of the permanent magnet included in the rotor of AC motor M1 (M2) (step S1). The process in step S1 is executed, for example, when a start instruction is given to hybrid vehicle drive apparatus 100. The initial temperature of the permanent magnet of AC motor M1 is set to temperature Ta (oil temperature).

In step S2, control device 30 (more specifically, temperature estimation unit 302 shown in FIG. 6) obtains temperature Ta, torque command value TR1, and motor revolution number MRN1. Control device 30 selects a map corresponding to temperature Ta from among a plurality of maps. As described above, control device 30 estimates magnet temperature Tmg1 of the permanent magnet included in the rotor of AC motor M1 based on the map, torque command value TR1, and motor revolution number MRN1.

In step S3, control device 30 determines whether or not magnet temperature Tmg1 is a prescribed temperature T1 or higher. If magnet temperature Tmg1 is temperature T1 or higher (YES in step S3), the process proceeds to step S4. On the other hand, if magnet temperature Tmg1 is smaller than temperature T1 (NO in step S3), the process returns to step S2.

When magnet temperature Tmg1 becomes temperature T1 or higher, control device 30 executes a process of limiting torque of AC motor M1 (a load factor limiting process) (step S4). Specifically, control device 30 limits current flowing in AC motor M1, that is, output current of inverter 14. Upon completion of the process in step S4, the process returns to step S2.

Figure 14:
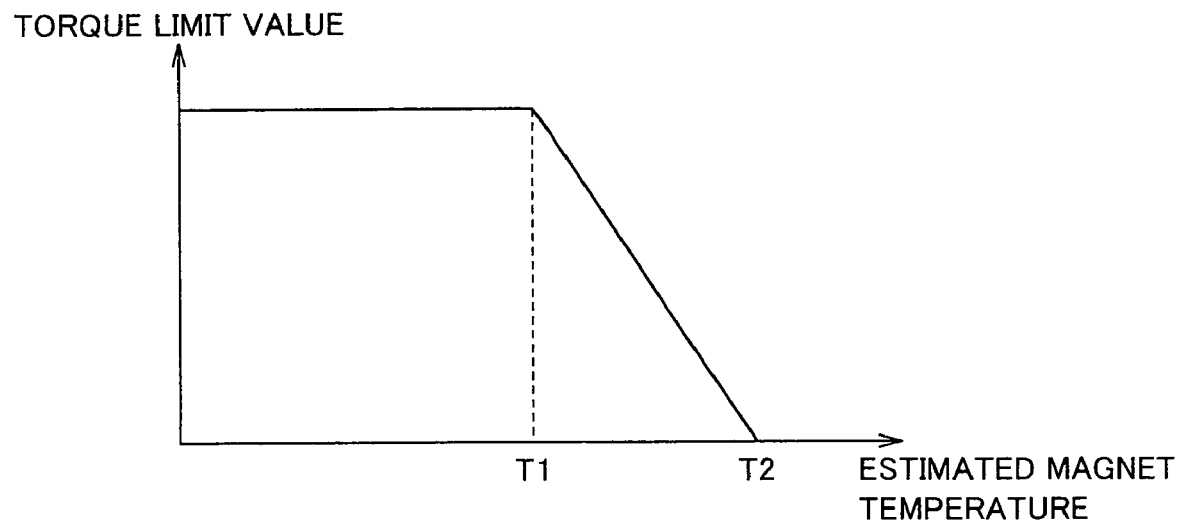
FIG. 14 is a graph illustrating a load factor limiting process for AC motor M1.

FIG. 14 is a graph illustrating the load factor limiting process for AC motor M1.

In FIG. 14, the axis of abscissas in the graph shows the magnet estimated temperature (magnet temperature Tmg1) and the axis of ordinates in the graph shows a torque limit value of AC motor M1. Control device 30 decrease the torque limit value when the magnet temperature exceeds T1. When the magnet temperature reaches T2 or higher, control device 30 sets the torque limit value to, for example, 0. Control device 30 controls the output current of inverter 14 so that the output torque of AC motor M1 does not exceed the torque limit value. Accordingly, when magnet temperature Tmg1 exceeds T1, the torque of AC motor M1 is limited.

Figure 15:
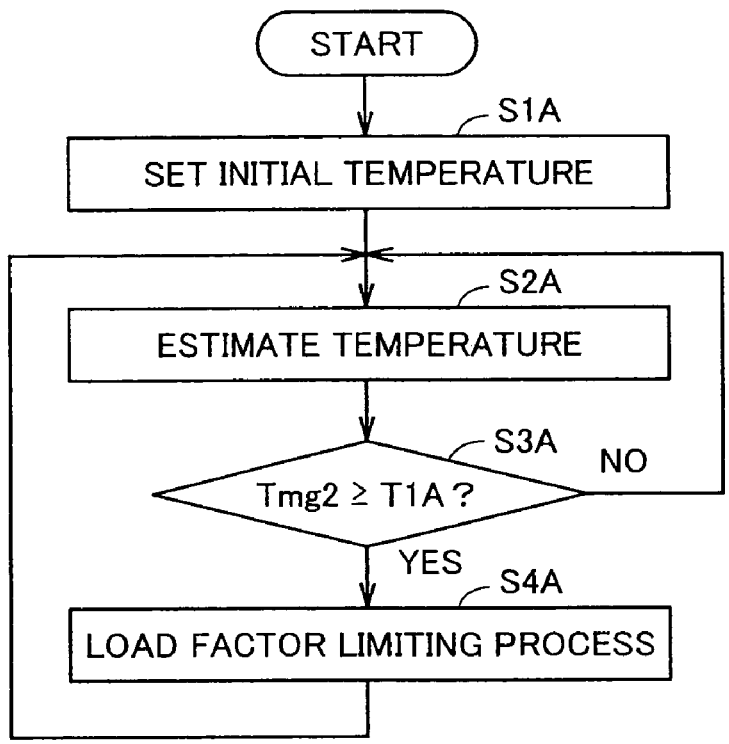
FIG. 15 is a flowchart showing a control process of AC motor M2 in the present embodiment.

FIG. 15 is a flowchart showing a control process for AC motor M2 in the present embodiment.

Referring to FIG. 15 and FIG. 1, upon the start of the process, control device 30 sets an initial temperature of the permanent magnet included in the rotor of AC motor M2 (step S1A). The initial temperature of the permanent magnet of AC motor M2 is set to temperature Ts (the temperature of the stator coil).

In step S2A, control device 30 (more specifically, temperature estimation unit 302 shown in FIG. 6) estimates magnet temperature Tmg2 of the permanent magnet included in the rotor of AC motor M2 by substituting temperature Ts in a correlation equation stored in advance.

In step S3A, control device 30 determines whether or not magnet temperature Tmg2 is a prescribed temperature T1A or higher. If magnet temperature Tmg2 is temperature T1A or higher (YES in step S3A), the process proceeds to step S4A. On the other hand, if magnet temperature Tmg2 is smaller than temperature T1A (NO in step S3A), the process returns to step S2A.

When magnet temperature Tmg2 becomes temperature T1A or higher, control device 30 executes a process of limiting torque of AC motor M2 (a load factor limiting process) (step S4A). Control device 30 limits current flowing in AC motor M2, that is, output current of inverter 31. Upon completion of the process in step S4A, the process returns to step S2A.

Figure 16:
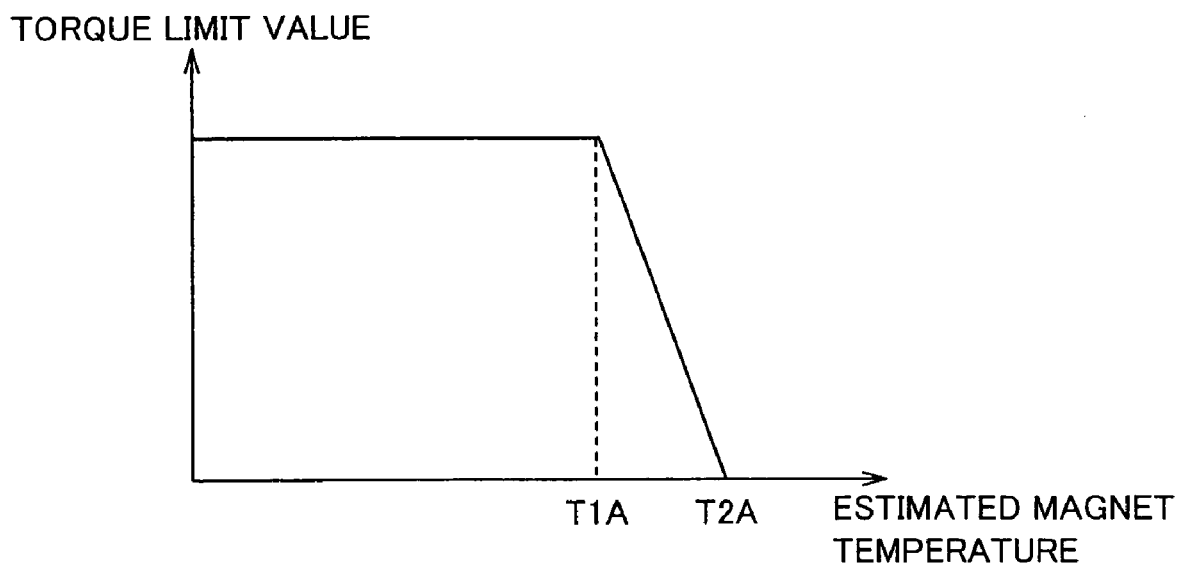
FIG. 16 is a diagram illustrating a load factor limiting process for AC motor M2.

FIG. 16 is a graph illustrating the load factor limiting process for AC motor M2.

In FIG. 16, the axis of abscissas in the graph shows the magnet estimated temperature (magnet temperature Tmg2) and the axis of ordinates in the graph shows a torque limit value of AC motor M2. Control device 30 decrease the torque limit value when the magnet temperature exceeds T1A. When the magnet temperature reaches T2A or higher, control device 30 sets the torque limit value to, for example, 0. Control device 30 controls the output current of inverter 14 so that the output torque of AC motor M2 does not exceed the torque limit value. Accordingly, when magnet temperature Tmg2 exceeds T1A, the torque of AC motor M2 is limited.

The temperature of the permanent magnet can be decreased by operating AC motor M1 (M2) with the output torque being limited. Thus, demagnetization of the permanent magnet can be prevented.

In this way, in the present embodiment, AC motors M1, M2 have structures different from each other (the shaft lengths are different). Control device 30 estimates magnet temperatures Tmg1, Tmg2 to control IPM 35 (inverters 14, 31) based on magnet temperatures Tmg1, Tmg2. Control device 30 estimates magnet temperature Tmg1 using the first parameter (the temperature of cooling oil of AC motors M1, M2). Control device 30 estimates magnet temperature Tmg2 based on the second parameter (the temperature of stator coil 46.2). An appropriate parameter is selected from among a plurality of parameters concerning the state of AC motors M1, M2 based on the difference in structure between AC motors M1 and M2, so that the magnet temperature can be estimated more accurately.

Furthermore, in accordance with the present embodiment, drive control can be performed on the rotating electric machine coupled to the engine of the vehicle and the rotating electric machine coupled to the drive wheel of the vehicle, while demagnetization of the permanent magnets is prevented.

In addition, in the vehicle in accordance with the present embodiment, a plurality of rotating electric machines having different structures can be driven while demagnetization of the permanent magnets is prevented.

It is noted that converter control unit 301, temperature estimation unit 302, and inverter control unit 303 in control device 30 in the present embodiment each may be formed by a circuit having a function corresponding to each block or may be realized by the control unit executing a process according to a preset program. In the latter case, the control of control device 30 described above is performed by a CPU (Central Processing Unit). CPU reads a program for executing the process shown in the foregoing functional blocks and flowcharts from a ROM (Read Only Memory) and executes the read program to execute the process according to the foregoing functional blocks and flowcharts. Therefore, the ROM corresponds to a computer (CPU) readable recording medium having a program recorded thereon for executing the process shown in the foregoing functional blocks and flowcharts.

Here, a plurality of parameters concerning the state of the AC motors are not limited to the parameters for use in the thermal model in FIG. 9 but may include other parameters, for example, such as the number of revolutions of the AC motor.

It should be understood that the embodiment disclosed herein should be illustrative rather than limitative in all respects. The scope of the present invention is not shown in the foregoing description but in the claims, and the equivalents to the claims and all the modifications within the claims are intended to be embraced.

The invention claimed is:

1. A drive control apparatus for rotating electric machines for driving and controlling a first rotating electric machine including a first rotor having a first permanent magnet and a second rotating electric machine having a structure different from said first rotating electric machine and including a second rotor having a second permanent magnet, comprising:

a drive unit for driving said first and second rotating electric machines; and a control unit for estimating a temperature of said first permanent magnet and a temperature of said second permanent magnet, and for controlling said drive unit based on a result of the estimation, said control unit including a temperature estimation unit for selecting a first parameter indicating a temperature of a first element receiving heat from said first rotor and a second parameter indicating a temperature of a second element receiving heat from said second rotor, from among a plurality of parameters concerning states of said first and second rotating electric machines based on a difference in structure between said first and second rotating electric machines, and for estimating the temperature of said first permanent magnet and the temperature of said second permanent magnet using said first and second parameters, respectively, wherein a length in a rotation axis direction of said second rotating electric machine is longer than a length in a rotation axis direction of said first rotating electric machine, said first rotating electric machine further includes a first stator provided around said first rotor, said second rotating electric machine further includes a second stator provided around said second rotor, said first and second rotors and said first and second stators are cooled by a cooling medium, said first parameter is a temperature of said cooling medium, and said second parameter is a temperature of said second stator.

2. The drive control apparatus for the rotating electric machines according to claim 1, wherein said cooling medium is cooling oil.

3. The drive control apparatus for the rotating electric machines according to claim 1, wherein
said drive unit includes first and second inverters for driving said first and second rotating electric machines, respectively, and
said control unit further includes an inverter control unit for limiting output current of said first inverter when the temperature of said first permanent magnet is a first threshold temperature or higher, and for limiting output current of said second inverter when the temperature of said second permanent magnet is a second threshold temperature or higher.

4. The drive control apparatus for the rotating electric machines according to claim 1, wherein
said first and second rotating electric machines are mounted on a vehicle including an internal combustion engine and a drive wheel,
said first rotating electric machine is coupled to said internal combustion engine, and
said second rotating electric machine is coupled to said drive wheel.

5. A vehicle, comprising:
a first rotating electric machine including a first rotor having a first permanent magnet, and a first stator provided around said first rotor;
a second rotating electric machine having a structure different from said first rotating electric machine, and including a second rotor having a second permanent magnet, and a second stator provided around said second rotor, wherein a length in a rotation axis direction of said second rotating electric machine is longer than a length in a rotation axis direction of said first rotating electric machine;
a drive unit for driving said first and second rotating electric machines; and
a control unit for estimating a temperature of said first permanent magnet and a temperature of said second permanent magnet, and for controlling said drive unit based on a result of the estimation,
said control unit including a temperature estimation unit for selecting a first parameter indicating a temperature of a first element receiving heat from said first rotor and a second parameter indicating a temperature of a second element receiving heat from said second rotor, from among a plurality of parameters concerning states of said first and second rotating electric machines based on a difference in structure between said first and second rotating electric machines, and for estimating the temperature of said first permanent magnet and the temperature of said second permanent magnet using said first and second parameters, respectively, wherein
said first and second rotors and said first and second stators are cooled by a cooling medium,
said first parameter is a temperature of said cooling medium, and
said second parameter is a temperature of said second stator.

6. The vehicle according to claim 5, wherein said cooling medium is cooling oil.

7. The vehicle according to claim 5, wherein
said drive unit includes first and second inverters for driving said first and second rotating electric machines, respectively, and
said control unit further includes an inverter control unit for limiting output current of said first inverter when the temperature of said first permanent magnet is a first threshold temperature or higher, and for limiting output current of said second inverter when the temperature of said second permanent magnet is a second threshold temperature or higher.

8. The vehicle according to claim 5, further comprising:
an internal combustion engine having said first rotating electric machine coupled thereto; and
a drive wheel having said second rotating electric machine coupled thereto.

* * * * *